Figure 1:
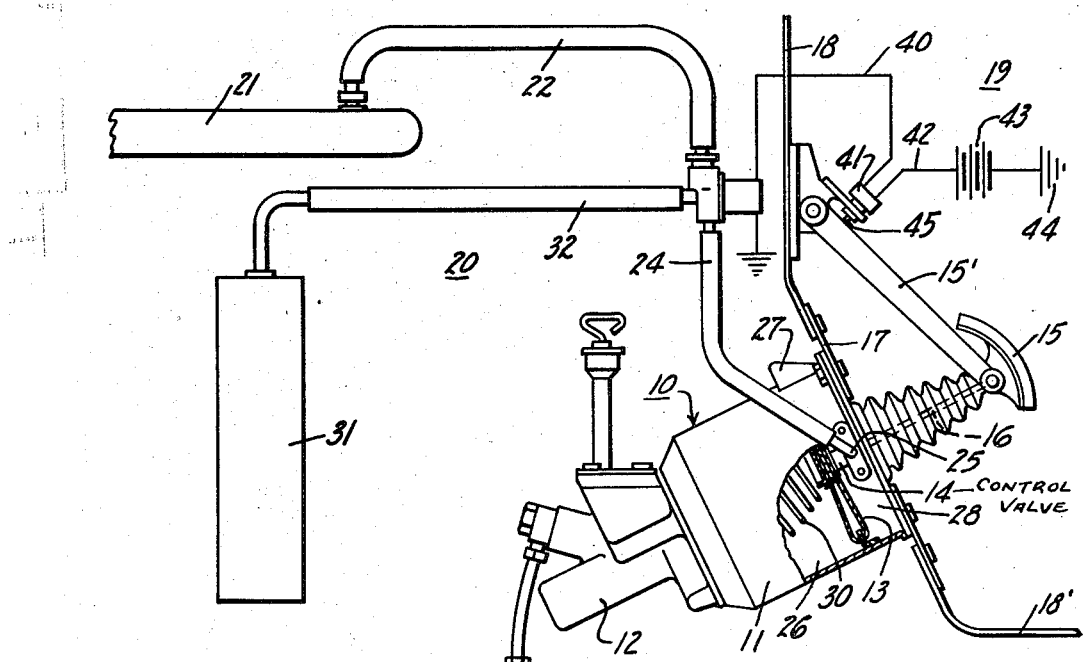

May 3, 1960   E. E. HUPP ET AL   2,934,903
POWER BRAKING SYSTEM HAVING RESERVOIR CONTROL MEANS
Filed March 29, 1954

INVENTOR
EDWARD E. HUPP
EDWIN E. PRATHER
BY
Samuel Meerkreebs
ATTORNEY

United States Patent Office 2,934,903
Patented May 3, 1960

2,934,903

POWER BRAKING SYSTEM HAVING RESERVOIR CONTROL MEANS

Edward E. Hupp and Edwin E. Prather, South Bend, Ind., assignors to Bendix Aviation Corporation, South Bend, Ind., a corporation of Delaware Application March 29, 1954, Serial No. 419,532

20 Claims. (Cl. 60—60)

This invention relates to power braking systems incorporating a vacuum to create a pressure-differential in a power boosting device and is particularly concerned with providing an available emergency source of vacuum in the brake system in the event the primary source of vacuum is not available.

In power braking systems utilizing engine intake manifold pressure (manifold suction) as the power medium for the booster, it is desirable to have a certain amount of reserve pressure available for use in case the main or primary source should be temporarily nullified as by engine failure or during periods when the brakes are applied to hold a vehicle stationary on a grade while starting the engine. A usual practice has been to provide a vacuum reserve tank connected to an intake manifold or vacuum source through a check valve and to connect said reserve source to a power booster, so that the reserve supply is being maintained at a usable value as long as the engine is running, while at the same time it is available when the control valve for the booster is "cracked" or opened to energize the booster. The main objection to this arrangement is that from a manufacturing standpoint it is not practical to make the connection with the booster air-tight, and the reserve-vacuum supply leaks off within a relatively short time after the engine is stopped. While emergency manual braking is usually available in most systems, yet it involves delay and a much greater effort on the part of the operator and there is always the chance that the operator may be confused by the element of surprise in the event power-assisted braking is not available.

The primary object of the instant invention, therefore, is to provide in a power braking system incorporating a power booster actuated by a pressure-differential; a primary source for creating a pressure-differential supply to the power booster associated with an emergency source for creating pressure-differential when said primary source is unavailable; the emergency source remaining usable to provide emergency braking.

A further object is to provide in a braking system incorporating a primary vacuum source to create a pressure-differential in a power booster, said primary vacuum source also supplying emergency vacuum; an emergency braking system available in the event of failure of the primary vacuum source.

Another object of this invention is to provide in a combined manually actuated power-assisted braking system incorporating a vacuum source to supply a pressure differential to actuate a power booster; an emergency source of vacuum available to the power booster in the event the primary source of vacuum fails, including valve means and emergency braking system activating means.

An additional object is to provide a vacuum actuated power brake system incorporating an emergency vacuum system in the event of failure of a primary source of vacuum; a commercially practical emergency brake system in the event the primary source of vacuum is not available.

The foregoing and other objects and advantages of the invention will be apparent from the following detailed description considered in connection with the accompanying drawings, submitted for the purpose of illustration and not intended to define the scope of invention, reference being had for that purpose to the subjoined claims.

Figure 2:
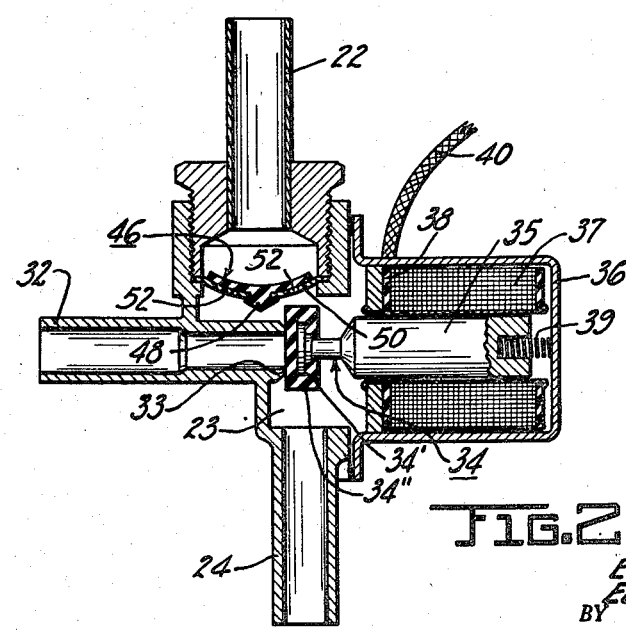

In the drawings, wherein similar reference characters refer to similar parts throughout the several views:

Figure 1 is a schematic view of a combined manual and power-assisted hydraulic braking system incorporating the invention; and Figure 2 is an enlarged detailed sectional view of a control valve and associated piping forming part of the system of Figure 1.

Referring to Figure 1, a power-assisted master cylinder unit is generally indicated at 10; since its particular construction is not germane to the present invention, only the principal parts thereof are shown. The unit includes a power cylinder 11 having a hydraulic cylinder 12 mounted on the end thereof in which fluid is displaced by a reciprocable rod or piston member, not shown, operatively connected to a pressure responsive movable wall power piston 13, which is caused to deliver a power stroke when pressure-differential is established thereacross through actuation of a control valve 14, by means of a foot pedal or treadle 15 and connecting rod 16; the pedal or treadle 15 being mounted on the free end of a pivot arm 15'. Displacement of fluid in cylinder 12 in turn affects displacement of fluid in a brake motor system and actuates the wheel brakes in a known manner. The power cylinder 11 has an integral mounting flange 17 by means of which it is secured to a toeboard 18' of a firewall 18, which separates the driver's compartment 19 from the engine compartment 20 of the motor vehicle to be equipped with the braking systems embodying the invention.

The power unit is to be of the atmospheric or vacuum suspended type, the choice being dictated by conditions of manufacture, installation and use. In this particular instance, it will be assumed that the power unit is of the atmospheric suspended type actuated from a vacuum source. Proceeding on this assumption, when the engine is running and the brakes are released, manifold pressure, hereinafter termed "vacuum," is communicated from intake manifold 21 by way of pipe or conduit 22, through chamber 23 of a valve mechanism to be subsequently described (Figure 2), an inlet pipe or conduit 24 to inlet point 25 of the power booster. At this point the vacuum is blocked off from chamber 26 of the power cylinder 11 by an annular land (not shown) on the sliding control valve 14. Atmosphere or air under atmospheric pressure, is in communication through air cleaner or filter 27 to chamber 28 of the power cylinder by way of receivable co-acting porting, not shown, associated with control valve 14. In the normal condition of the control valve 14, atmospheric pressure is communicated from chamber 28 through the valve to chamber 26 so that the pressure-differential across the piston 13 is zero, and a return spring 30 holds the piston in an inactive brake-release position.

To apply the brakes, pedal 15 is depressed moving control valve 14 associated with power piston 13, whereupon atmosphere is closed from chamber 26 of the power cylinder and vacuum is communicated to said latter chamber, producing a pressure-differential across the power piston which moves the latter toward the hydraulic cylinder 12 on a power stroke, in a direction to effect displacement of fluid in the hydraulic cylinder. The control valve has a follow-up action, so that when the brake pedal is depressed sufficiently to obtain the desired braking force, no further movement of the power piston 13 takes place until the pedal is further depressed or released.

A vacuum reservoir or storage tank 31 connects with the chamber 23 by way of pipe line or conduit 32, which terminates in a valve seat 33. A check valve assembly 34, shown as the poppet type, is adapted to engage the seat 33, said valve includes a head 34' surrounded by resilient material 34" to insure proper sealing of conduit 32; said head is on the end of the solenoid plunger or reciprocating armature 35, forming part of a solenoid valve unit comprising in addition to the check valve and plunger, a casing 36, grounded coil 37, end plate 38 and spring 39.

Coil 37 connects by wire 40 in the one terminal of a switch 41, which conveniently may be the conventional stop-light switch found on most automotive vehicles, the other terminal of said switch being connected by wire 42 to the positive terminal of a battery or other suitable source of potential 43, having its negative terminal grounded at 44. The switch 41 is provided with a spring-pressed plunger 45, the downwardly-projecting head of which normally engages the brake pedal arm 15' when the pedal 15 is in released position, at which time the switch is opened. When the pedal is depressed to apply the brakes, the plunger 45 is released and switch 41 closed.

The end of the manifold pipe 22 which projects into the chamber 23 is provided with a suitable check valve 46, here shown in the form of a flexible membrane or flapper having its central portion formed with a button 48, by means of which the membrane is secured to a perforated base 50 with the edges thereof unsecured and free to move upwardly and uncover the perforations 52 when suction is developed in pipe 22.

*Operation*

In the positions of the respective parts of the system as shown in the drawing, the brakes are released, the brake pedal 15 being up or back depressing switch plunger 45 and opening switch 41; hence solenoid coil 37 is de-energized and spring 39 has moved plunger 35, causing check valve 34 to close or seat on the valve end 33 of pipe or tubing 32.

It is readily apparent from the drawing that the check valve 34 is operative at all times to trap and hold in reservoir 31, the highest vacuum developed in the system, i.e., when the engine is running, and before the solenoid coil 37 is energized due to depression of pedal 15, any time a pressure differential occurs on check valve 34 to overcome the force of spring 39, due to development of a vacuum of a greater value than that in reservoir 31, check valve 34 will be unseated to store vacuum in the auxiliary reservoir 31 the highest vacuum developed by the manifold 21, so that it will be available in the system during an emergency condition, to be subsequently described.

If, while the engine is running, the brake pedal is depressed to actuate the brakes, movement of arm 15' will cause switch 41 to close, coil 37 will be energized and plunger 35 will be caused to move overcoming the pressure of spring 39; whereupon plunger 35 will move valve 34 off seat 33 on the end of pipe or tube 32. While the engine is running, and before the coil 37 is energized to move plunger 35 and unseat valve 34, manifold suction or "vacuum" from manifold 21 is in communication with control valve 14 of the power cylinder 11, through pipe 22, past the check valve 46, said check valve permitting suction in the direction of the manifold 21, through chamber 23, through pipe 24 and up to inlet point 25. As previously mentioned, depression of pedal 15 causes valve 34 to become unseated from seat 33, when this occurs vacuum reservoir 31 is placed in communication with manifold suction through pipe 32 leading into chamber 23. As heretofore described, actuation of pedal 15 causes movement of control valve 14 in power piston 11 and a pressure-differential is caused across power piston 13 resulting in a power stroke.

When the brake pedal 15 is released, switch plunger 45 will be depressed by arm 15' causing switch 41 to open thereby opening the circuit to the coil 37 and de-energizing the latter; whereupon the spring 39 will cause plunger 35 to move to the position shown in Figure 2, seating valve 34 on the valve seat 33 of pipe 32 and trapping vacuum in the tank or reservoir 31.

In the event the engine stalls on a hill, cuts out while the vehicle is moving, or at any time that manifold vacuum pressure in pipe 22 from manifold 21 is of a value less than that in reservoir 31, an emergency situation exists in which the vacuum trapped in the reservoir 31 can be called upon to operate the brake applying power cylinder. Depression of pedal 15 will cause coil 37 to be energized and plunger 35 to be moved to overcome the force of spring 39 and valve 34 to become unseated, as previously explained. The vacuum from reservoir 31 will then be available in chamber 26 to actuate the power cylinder 11. It is to be noted that since the vacuum pressure in pipe 22 is below the value of that in reservoir 31 and chamber 23 an emergency condition exists, a pressure differential will exist on the check valve 46, causing it to close communication off between pipe 22 and chamber 23. Thus there is an emergency braking system available which does not depend upon manifold suction.

Utilizing a power braking system embodying the reserve vacuum with the mechanism as herein disclosed, loss of reserve vacuum through the inlet connection to the power unit is obviated. This is an important advantage, since the working tolerances of the control valve 14 and associated mechanism at the point where the pipe or tube 24 connects with the power booster are usually such that will seal off reserve pressure for a limited time only.

Although only one embodiment of the invention has been illustrated and described, the invention is not to be limited in its application to the details of construction and arrangement of parts as illustrated in the drawing, since the invention is capable of other embodiments and of being practiced or carried out in various ways.

We claim:

1. In a system incorporating a power device utilizing fluid under pressure as a power medium and a motive means which while operating functions as a fluid pressure generating source, a reservoir for storing reserve fluid for use as a power medium during periods when the pressure generated by said source becomes ineffective to actuate said power device, a first fluid connection communicating said source with said power device, a one-way check valve in said connection, a second fluid connection which when open communicates said reservoir with said power device and also with said first connection beyond said check valve, a valve member movable to a first position closing said second connection when the power device is de-energized and to a second position opening said latter connection when said power device is energized, a control element movable to admit fluid to and shut off fluid from the power device, and means responsive to movement of said element for controlling said valve member.

2. A system as claimed in claim 1, wherein said means responsive to movement of said element for controlling said valve member comprises an electric solenoid valve and an associated electric circuit, said valve having an armature carrying said valve member.

3. A system as claimed in claim 1, wherein said means responsive to movement of said element for controlling said valve member comprises an electric solenoid valve and an associated electric circuit, said valve having a reciprocating plunger-type armature carrying said valve member, and yieldable means urging said solenoid to a position seating said valve member.

4. In a system incorporating a power device utilizing two fluid mediums under different pressures and means which develops one of said fluid mediums, a reservoir for storing said one medium for use with said device during periods when said means fails to develop said one medium to effect operation of said device, a first connection communicating said means with said device, a second connection communicating said reservoir with said means and said device, a shut-off valve in said second connection, a member movable for establishing one of said fluid mediums in said device, and mechanism actuable upon movement of said member for opening said valve.

5. A system as claimed in claim 4, wherein said mechanism actuable upon movement of said member for opening said valve includes an electric solenoid and an associated electric circuit, said solenoid having an armature carrying said valve.

6. A system as claimed in claim 5 wherein said armature is a reciprocable plunger type armature and yieldable means urge said armature to a position sealing said valve.

7. A system as claimed in claim 6 wherein check valve means are included in said first connection.

8. In a system of the type having a control valve for regulating the flow of a pressure fluid between two fluid pressure sources to operate a brake applying fluid pressure motor or the like, a reservoir adapted to act as an auxiliary to one of said fluid pressure sources, fluid conducting means connecting said reservoir with said one of said fluid pressure sources and said control valve, said control valve having a normal position for deenergizing said fluid pressure motor in which leakage occurs between said fluid conducting means and said control valve, valve means in said fluid conducting means for closing off communication between said one of said fluid pressure sources and said reservoir upon failure of said one of said fluid pressure sources, valve means in said fluid conducting means for normally preventing flow between said control valve and said reservoir, a movable member for regulating said control valve, and means for opening said second mentioned valve means upon movement of said movable member in a manner to operate said control valve.

9. An accessory system for automotive vehicles, comprising in combination with a source of fluctuating suction, a fluid motor having a normally closed operational control valve, a suction line connecting the source to the motor, a reservoir having a normally closed inlet valve and a self-closing outlet valve interposed in the suction line between the source and the motor, the suction line beyond the reservoir being sealed off by said inlet valve to prevent the leakage of air into the reservoir, and a selector for simultaneously opening both normally closed valves.

10. A pneumatic system for operating an accessory of a motor vehicle, comprising a reservoir having a normally closed inlet valve and a self-closing outlet valve, the latter being connectible to a source of operating pressure, a fluid actuated accessory having a normally closed operational control valve, a conduit connecting the operational control valve to the normally closed inlet valve, and means operatively connecting the inlet valve to the operational control valve for opening concurrently with the latter.

11. In a fluid pressure accessory system for automotive vehicles, an accessory having a fluid motor, a reservoir of power, a control valve for the motor, an inlet valve for the reservoir, a suction line connecting the two valves, said suction line being subject to the possibility of atmospheric leakage, means to simultaneously open both valves so as to intercommunicate the motor and reservoir, and further means to automatically replenish the reservoir.

12. In a fluid operated accessory system having a source of fluctuating suction, a reservoir, a self-closing outlet valve between the reservoir and the source, an electrically operated inlet valve between the accessory and the reservoir, means to activate and deactivate the accessory, and further means for opening and closing the inlet valve substantially simultaneously with the actuation of the means for activating and deactivating the accessory.

13. An accessory system for automotive vehicles, comprising in combination with a source of fluctuating suction, a fluid motor having an outlet valve, a suction line inter-connecting the source and the motor, a reservoir interposed between the source and the motor in the suction line, an inlet valve and an outlet valve for said reservoir, that portion of the suction line between the motor outlet valve and the reservoir inlet valve being partially vented to atmospheric pressure by parasitic leakage thereinto, and means for substantially simultaneously opening and closing the motor outlet valve and reservoir inlet valve.

14. An accessory system for automotive vehicles, comprising in combination with a source of suction, a fluid motor, a reservoir, a suction line interconnecting the reservoir and fluid motor, said suction line being normally subject to parasitic leakage of atmospheric air thereinto, a normally closed outlet valve between the motor and suction line, a normally closed inlet valve between the suction line and reservoir, means for automatically opening and closing said outlet and inlet valves substantially simultaneously, and further means operative upon the existence of a predetermined pressure differential between the reservoir and said source of suction for placing them in communication with one another.

15. A fluid accessory system for automotive vehicles comprising in combination, a source of suction, an accessory having a fluid motor with a forward stroke and a rearward stroke, said motor having a normally closed operational control valve, a suction line connecting the source to the motor, a reservoir interposed in the suction line and having normally closed inlet and outlet valves, said outlet valve opening automatically upon the existence of a predetermined pressure differential thereacross, that part of the suction line between the directional control valve and the inlet valve being subject to parasitic leakage thereinto, and means for simultaneously opening and closing said directional control valve and inlet valve of the reservoir.

16. A fluid pressure accessory system for automotive vehicles, comprising in combination with a source of fluctuating suction, a reservoir, a first suction line interconnecting the source and reservoir, a normally closed outlet valve between the reservoir and said first suction line, said valve opening automatically upon the eixstence of a predetermined pressure differential thereacross, a fluid motor having a forward stroke and a rearward stroke, a second suction line interconnecting the fluid motor and reservoir, an operational control valve between the fluid motor and second suction line, said operational control valve and second suction line being subject to parasitic leakage thereinto, a normally closed inlet valve sealing off the reservoir from the second suction line and preventing the leakage of the air into the reservoir, and selector means for simultaneously opening and closing said inlet valve and operational control valve.

17. In a fluid pressure accessory system for automotive vehicles, an accessory having a fluid motor, an operating valve for the fluid motor, a first conduit connected to the intake manifold of the vehicle's power plant, a reservoir connected to said first conduit, a check valve interposed between said first conduit and the reservoir, said valve including means operating automatically when the vacuum in the intake manifold is higher than the vacuum in said reservoir, a second conduit leading from the reservoir to said motor, a second valve sealing off the second conduit and the motor from the reservoir, said second valve including spring pressed means and independent power means, said power means operating to open said second valve to withdraw air from the motor for the operation thereof, and a unified manual control means to simultaneously actuate said power means and open the operating valve on the motor.

18. A pneumatic system, comprising a reservoir having a normally closed inlet valve and a self-closing outlet valve, the latter being connectible to a source of operating pressure, a fluid actuated accessory having a normally closed directional control valve, a conduit connecting the directional control valve to the normally closed inlet valve, and means automatically associating the operation of the inlet valve with the directional control valve.

19. In a fluid operated accessory system having a source of fluctuating suction, a reservoir, a self-closing outlet valve between the reservoir and the source, an electrically operated inlet valve between the accessory and the reservoir, means to activate and deactivate the accessory and further means for opening and closing said inlet valve automatically upon actuation of the means for activating and deactivating the accessory.

20. An accessory system for automotive vehicles comprising in combination with a source of fluctuating suction, a fluid motor having an operational control valve, a suction line connecting the source to the motor, a reservoir having an inlet valve and an outlet valve interposed in the suction line between the source and the motor, and a selector for substantially simultaneously actuating the operational control valve and the reservoir inlet valve.

References Cited in the file of this patent

UNITED STATES PATENTS

| | | |
|---|---|---|
| 1,297,193 | Levinsen | Mar. 11, 1919 |
| 1,403,290 | Catching | Jan. 10, 1922 |
| 2,142,514 | Jones | Jan. 3, 1939 |
| 2,323,406 | Milhaupt | July 6, 1943 |
| 2,373,272 | Stelzer | Apr. 10, 1945 |
| 2,429,195 | Price | Oct. 14, 1947 |
| 2,518,212 | Wilson | Aug. 8, 1950 |
| 2,705,870 | Holton | Apr. 12, 1955 |
| 2,773,353 | Oishei | Dec. 11, 1956 |